United States Patent [19]

Muth et al.

[11] Patent Number: 5,256,111
[45] Date of Patent: Oct. 26, 1993

[54] DRIVE CHAIN TENSIONER

[75] Inventors: James C. Muth, Eagle, Wis.; Thomas Haak-Frendscho, S. San Francisco, Calif.

[73] Assignee: Spacesaver Corporation, Fort Atkinson, Wis.

[21] Appl. No.: 953,606

[22] Filed: Sep. 29, 1992

[51] Int. Cl.$^5$ ............................................. F16H 7/08
[52] U.S. Cl. ............................................. 474/101
[58] Field of Search ........ 474/101, 109, 111, 113–117, 474/133–138

[56] References Cited

U.S. PATENT DOCUMENTS

| | | | |
|---|---|---|---|
| 3,738,189 | 6/1973 | Chen | 474/109 |
| 4,489,475 | 12/1984 | Strutimann et al. | 474/133 X |
| 4,498,889 | 2/1985 | Stevens et al. | 474/133 |
| 4,559,027 | 12/1985 | Sattel | |
| 5,058,507 | 10/1991 | Muth | |

*Primary Examiner*—Thuy M. Bui
*Attorney, Agent, or Firm*—Ryan, Kees & Hohenfeldt

[57] ABSTRACT

An apparatus for tensioning a belt or cable, reeved about first and second pulleys or sprockets, both mounted for rotation on supports. The apparatus includes a base plate and a post mounted through a closely-sized aperture in the base plate. An arm is mounted to the post at a mounting point at one end of the arm, such that the arm is rotatable about the post with respect to the base plate. An idler sprocket is rotatably attached to the arm at a point spaced apart from the mounting point of the arm, near the opposite end, and positioned so as to be engageable with the belt or chain. Engaging pins are positioned on the arm at a point near the idler sprocket. The base plate has corresponding holes for engaging the engaging pins on the arm in a plurality of positions with respect to the base plate. The post is a shoulder bolt which is inserted into the aperture from one side of the base plate and is fastened to the arm on the opposite side of the base plate by a nut threaded onto the end of the shoulder bolt, capturing the arm between the nut and the shoulder. A spring captured between the base plate and the head of the shoulder bolt biases the bolt to slide through the aperture in the base plate, so as to engage the pins in the holes.

12 Claims, 1 Drawing Sheet

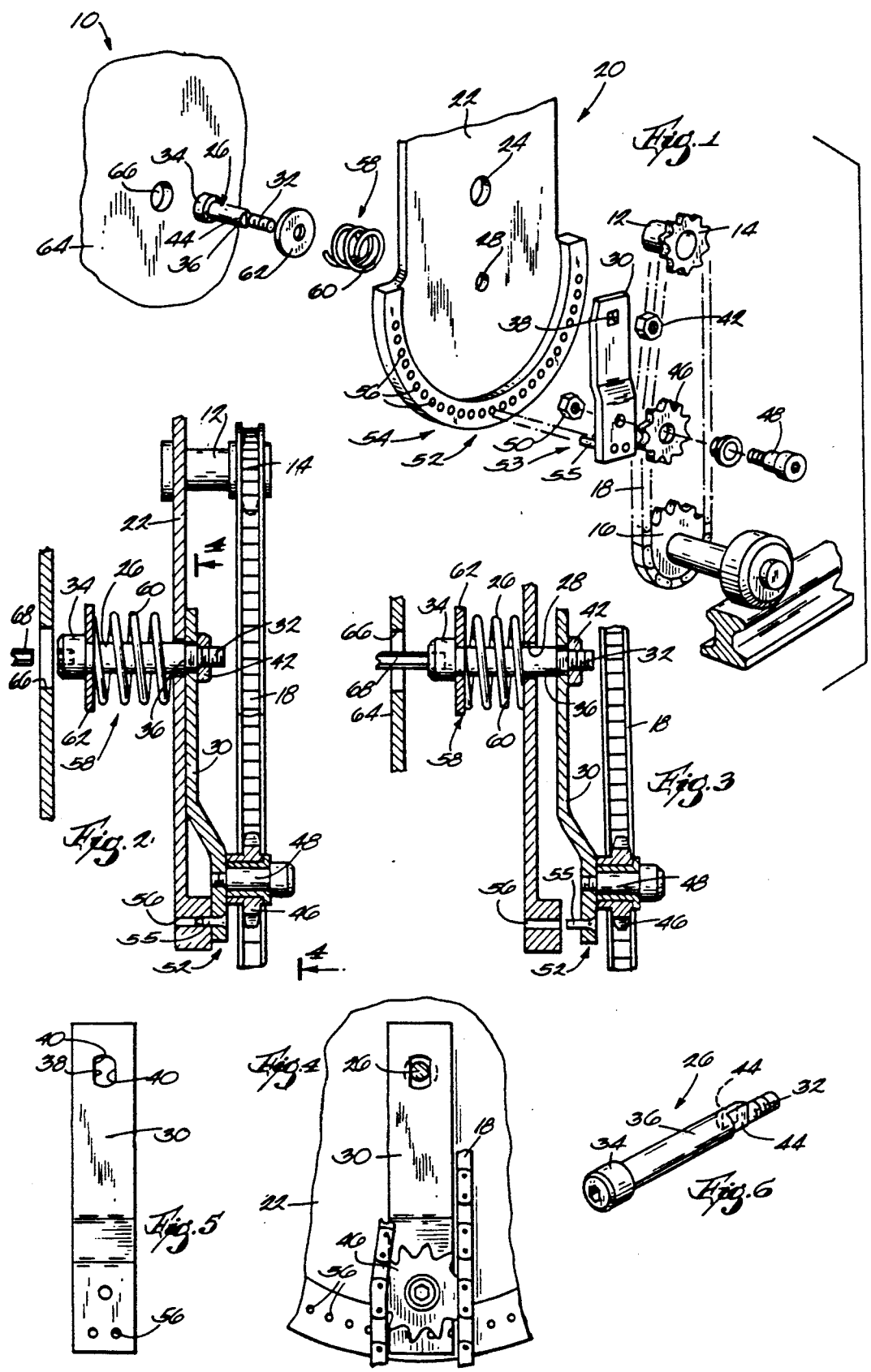

DRIVE CHAIN TENSIONER

BACKGROUND OF THE INVENTION

This invention relates to tensioning apparatus for chain drive systems, and in particular to tensioning systems for use on hand powered mobile storage systems.

Certainly the general concept of providing means to tighten or apply tension to chain or belt drive systems is not novel, and in fact is probably very nearly as old as the idea of chain drive itself. There has, however, been substantial development in chain tensioning devices.

See, for example, Muth, U.S. Pat. No. 5,058,507, assigned to the assignee of the present invention. This patent sets forth a chain drive tensioner for use with a carriage that has extremely low clearances for its frame, thus having to use wheel bearings other than standard pillow blocks. The tension supplied by that structure is finely adjustable by turning a screw. It requires access to the frame beneath the carriage, though.

A chain tightener that does not require access to the frame is disclosed in Sattel, U.S. Pat. No.4,559,027, also assigned to the assignee of the present invention. The chain tightener disclosed in this patent was designed mainly for manually operated mobile storage units, and again is adjusted by rotating threaded fasteners. In this case, turning the threaded fasteners flexes or deflects the shaft on which the wheels rotate.

While these chain tighteners have functioned admirably and sold successfully, there is need for structure wherein the tension supplied is more easily and quickly adjusted. The present invention relates to improvements to the tighteners described above, and to solutions to some of the problems raised or not solved thereby.

SUMMARY OF THE INVENTION

The invention provides an apparatus for tensioning an endless power transmission means, such as a belt, cable or chain, reeved about first and second pulleys or sprockets, both mounted for rotation on support means. According to the invention, the tensioning apparatus includes a base plate and a post mounted through a closely-sized aperture in the base plate. An arm is mounted to the post at a mounting point on the arm, likely at one end, such that the arm is rotatable about the post with respect to the base plate. An idler sprocket is rotatably attached to the arm at a point spaced apart from the mounting point of the arm, likely at the opposite end, and positioned so as to be engageable with the endless power transmission means. First engaging means are positioned on the arm at a point spaced apart from the mounting point of the arm, likely on the same end as the idler sprocket. The base plate has corresponding second engaging means for engaging the first engaging means with the arm in a plurality of positions with respect to the base plate. The invention provides biasing means for biasing the post to slide in a certain direction through the aperture in the base plate, and stop means to stop the post from sliding entirely out of the aperture. The first and second engaging means are designed so as to require the post to slide against the biasing means with respect to the base plate in order to disengage from each other, and the biasing means causes the engaging means to tend to reengage.

In one embodiment the first engaging means comprises at least one pin affixed to the arm, and the second engaging means comprises a plurality of holes in the base plate, sized and positioned to permit selective engagement by the pin to thereby lock the arm in a position determined by the particular hole engaged. The post is a shoulder bolt which is inserted into the aperture from one side of the base plate and is fastened to the arm on the opposite side of the base plate by a nut threaded onto the end of the shoulder bolt, capturing the arm between the nut and the shoulder. The biasing means comprises a coil spring captured between the base plate and the head of the shoulder bolt.

Other objects and advantages of the invention will become apparent hereinafter.

DESCRIPTION OF THE DRAWING

FIG. 1 is an exploded view of a chain tightening apparatus constructed according to a preferred embodiment of the invention.

FIG. 2 is a side view, partially in section, of the chain tightening apparatus shown in FIG. 1, showing the pin engaged with the back plate.

FIG. 3 is a side view, partially in section, of the chain tightening apparatus shown in FIG. 1, showing the pin disengaged from the back plate.

FIG. 4 is a front view of the chain tightening apparatus shown in FIG. 1, taken partially in section along line 4—4 of FIG. 2.

FIG. 5 is a front elevational view of an arm according to a preferred embodiment of the invention.

FIG. 6 is a perspective view, on a larger scale, of a post according to a preferred embodiment of the invention.

DESCRIPTION OF THE PREFERRED EMBODIMENT

Referring now to FIG. 1, there is shown a mobile storage unit 10 having a drive shaft 12 driving a drive sprocket 14, which in turn drives a driven sprocket 16 by means of a chain 18 reeved about both sprockets. The invention could equally well relate to any other type of endless power transmission means, such as a belt or cable reeved about two pulleys.

The invention is directed to providing an apparatus 20 to adjust and control the tension of the chain 18 about the sprockets 14, 16. According to the invention, the apparatus includes a base plate 22 which is substantially flat. Base plate 22 includes a first hole 24 to accommodate the passage therethrough and rotation therein of the drive shaft 12. A post 26 is mounted for free rotation through a second hole 28 provided for that purpose in base plate 22. Second hole 28 is spaced apart from first hole 24. The inside diameter of second hole 28 is sized so as to closely match the outer diameter of post 26, so that the post is just freely slidable in a longitudinal direction through the hole.

The invention provides for an arm 30 affixed to one end of the post 26 in a manner that prevents relative rotational motion between the post and the arm. In the embodiment shown in the drawing figures, post 26 is a shoulder bolt, having a threaded end 32, a head 34 at the other end, and a shoulder portion 36 therebetween. The threaded portion 32 passes through an opening 38, at one end of arm 30, which opening has flats 40 on at least one or two sides. The arm 30 is then attached onto the post 26 by a nut 42 tightened onto threaded portion 32, capturing the arm between the nut and the shoulder 36. Arm flats 40 engage corresponding flats 44 on the post so as to prevent relative rotation between the post 26 and the arm 30. Since post 26 is rotatable within second base plate hole 28, then, arm 30 is swingable with the post about the longitudinal axis of the post.

An idler sprocket 46 is rotatably attached by any suitable means to the arm 30 at a point some distance from the arm opening 38, nearly at the opposite end. In the embodiment shown in the drawing figures, the rotatable attachment is by a mounting bolt 48 threaded either into the arm 30 itself (as shown in FIGS. 2 and 3), or into a nut 50 (FIG. 1) capturing the arm between the nut and a shoulder portion of the mounting bolt. A bearing, such as a bushing 52, may be provided between mounting bolt 48 and sprocket 46 to facilitate the rotation of the sprocket since, as an idler sprocket, it will be rotating at relatively high speed whenever the mobile carriage unit is being moved. In the most preferred embodiment, and as can be seen well in FIGS. 2 and 3, arm 30 includes a pair of bends so that the end of the arm to which the idler sprocket 46 is attached is offset from the end attached to post 26. This offset is provided so that the idler sprocket aligns with the drive chain 18, while the other end of the arm is spaced apart from the chain.

Since the arm 30 is swingable about the axis of the post 26 with respect to the base plate 22, the invention calls for means 52 for removably locking the arm in a particular position with respect to the base plate. As shown in the drawing figures, locking means 52 includes engaging means 53 on the arm, and corresponding engaging means 54 on the base plate 22. In particular, arm engaging means 52 includes at least one and preferably two locking pins 55 affixed to the end of the arm 30 opposite the arm opening 38. These pins 55 are sized and spaced apart from each other and from the arm opening 38 so as to be alignable and selectively engageable with base plate engaging means 54, in this case an array of pin engagement holes 56 in the base plate 22. As shown in FIGS. 1 and 4, in this embodiment these pin engagement holes 56 are evenly arranged about an arc of a circle, with second base plate hole 28 as its center.

As indicated above, in this embodiment post 26 is a shoulder bolt having head 34. This embodiment of the invention calls for biasing means 58 for biasing post 26 to slide in a direction so that head 34 is forced away from base plate 22, and arm 30 is forced toward the base plate. As shown in FIGS. 1 through 3, this biasing means 58 includes a coil spring 60 surrounding the post 26 and bearing between the base plate 22 and a washer 62, which in turn bears on the head 34. Hence coil spring 60 tends to force head 34 away from base plate 22, in turn forcing arm 30 toward the base plate, thus causing pins 55 to engage holes 56.

In use, then, the tensioning apparatus 20 will generally be located behind a panel 64 of mobile storage unit 10, and will be accessible through a hole 66 in that panel. A wrench 68 (FIGS. 3 and 4) is inserted through the panel hole 66 and engaged with the head 34. As shown in FIG. 5, the head 34 may be formed suitably to receive an Allen wrench, although any suitable wrench and head would serve the same purpose. Once the wrench 68 is inserted in the panel hole 66 and engaged with the head 34, the wrench is forced further into the hole against the force of the spring 60, disengaging the pins 55 from the holes 56. With the pins 55 and holes 56 disengaged, the wrench 68 is rotated, swinging the idler sprocket 46 away from its center position and exerting tension on the chain 18. While continuing to exert this tension on the chain 18, the wrench 68 is withdrawn at least partway from the hole 66, permitting arm 30 to move back toward base plate 22. If the pins 55 are at that time aligned with a set of holes 56, they will engage and the tension will be maintained in chain 18 just as was applied by rotating the wrench 68. If however there are no holes directly aligned with pins 55 at that tension, the tension in chain 18 itself will cause arm 30 to swing slightly back toward center until pins 55 encounter the next set of holes 56, at which time the pins 55 will engage those holes 56.

Thus the invention provides a tensioning device which is easy and quick to use, hidden from the casual user, and provides sufficient tension that the carriage may be moved easily by the user.

While the apparatus hereinbefore described is effectively adapted to fulfill the aforesaid objects, it is to be understood that the invention is not intended to be limited to the specific preferred embodiment of drive chain tensioner set forth above. Rather, it is to be taken as including all reasonable equivalents within the scope of the following claims.

We claim:

1. A mobile storage apparatus adapted for substantially linear movement along a track, comprising:
   A) a driven shaft rotatable with respect to support means and connected to a wheel riding on said track;
   B) drive means for rotating said shaft, said drive means including:
      1) a prime mover connected by a drive shaft to a first sprocket, said first sprocket rotatable with respect to said support means,
      2) a second sprocket, positioned on said driven shaft, and
      3) a chain connecting and reeved about said first and second sprockets; and
   C) apparatus for tensioning said chain, said tensioning apparatus including:
      1) a base plate mounted to said support means;
      2) a post mounted through a closely-sized aperture in said base plate;
      3) an arm mounted to said post at a mounting point on said arm, such that said arm is rotatable with respect to said base plate;
      4) an idler sprocket rotatably attached to said arm at a point spaced apart from the mounting point of said arm;
      5) first engaging means on said arm at a point spaced apart from the mounting point of said arm;
      6) second engaging means on said base plate for engaging said first engaging means with said arm in a plurality of positions with respect to said base plate.

2. A mobile storage apparatus as recited in claim 1 further comprising:
   biasing means for biasing said post to slide in a certain direction through said aperture; and
   stop means for stopping said post from sliding out of said aperture;
   said first and second engaging means requiring said post to slide with respect to said base plate in order to disengage and reengage.

3. A mobile storage apparatus as recited in claim 2 wherein said first and second engaging means require said post to slide against said biasing means in order to disengage, and said biasing means tends to force said engaging means to reengage.

4. A mobile storage apparatus as recited in claim 2 wherein said first engaging means comprises at least one pin affixed to said arm, and said second engaging means comprises a plurality of holes in said base plate, sized and positioned to permit selective engagement by said pin to thereby lock said arm in a position determined by the particular hole engaged.

5. A mobile storage apparatus as recited in claim 2 wherein said post comprises a shoulder bolt which is inserted into said aperture from one side of said base plate and is fastened to said arm on the opposite side of said base plate by a threaded fastener.

6. A mobile storage apparatus as recited in claim 5 wherein said shoulder bolt has a head, and wherein said biasing means comprises a coil spring captured between said base plate and said shoulder bolt head.

7. An apparatus for tensioning an endless power transmission means reeved about first and second sprockets, both of said sprockets mounted for rotation on support means, said tensioning apparatus including:
   a base plate;
   a post mounted through a closely-sized aperture in said base plate;
   an arm mounted to said post at a mounting point on said arm, such that said arm is rotatable with respect to said base plate;
   an idler sprocket rotatably attached to said arm at a point spaced apart from the mounting point of said arm and positioned so as to be engageable with said endless power transmission means;
   first engaging means on said arm at a point spaced apart from the mounting point of said arm;
   second engaging means on said base plate for engaging said first engaging means with said arm in a plurality of positions with respect to said base plate.

8. A tensioning apparatus as recited in claim 7 further comprising:
   biasing means for biasing said post to slide in a certain direction through said aperture; and
   stop means for stopping said post from sliding out of said aperture;
   said first and second engaging means requiring said post to slide with respect to said base plate in order to disengage and reengage.

9. A tensioning apparatus as recited in claim 8 wherein said first and second engaging means require said post to slide against said biasing means in order to disengage, and said biasing means tends to force said engaging means to reengage.

10. A tensioning apparatus as recited in claim 8 wherein said first engaging means comprises at least one pin affixed to said arm, and said second engaging means comprises a plurality of holes in said base plate, sized and positioned to permit selective engagement by aid at least one pin to thereby lock said arm in a position determined by the particular hole engaged.

11. A tensioning apparatus as recited in claim 8 wherein said post comprises a shoulder bolt which is inserted into said aperture from one side of said base plate and is fastened to said arm on the opposite side of said base plate by a threaded fastener.

12. A tensioning apparatus as recited in claim 11 wherein said shoulder bolt has a head, and wherein said biasing means comprises a coil spring captured between said base plate and said shoulder bolt head.

* * * * *

UNITED STATES PATENT AND TRADEMARK OFFICE
CERTIFICATE OF CORRECTION

PATENT NO. : 5,256,111
DATED : October 26, 1993
INVENTOR(S) : Muth, et. al.

It is certified that error appears in the above-indentified patent and that said Letters Patent is hereby corrected as shown below:

Column 6, Claim 10, line 23, delete "aid" and substitute therefor -- said--

Signed and Sealed this

Thirtieth Day of August, 1994

Attest:

BRUCE LEHMAN

Attesting Officer

Commissioner of Patents and Trademarks